US010631118B2

(12) United States Patent
Sharma et al.

(10) Patent No.: US 10,631,118 B2
(45) Date of Patent: *Apr. 21, 2020

(54) MAINTAINING PRIVACY IN LOCATION-BASED OPERATIONS

(71) Applicant: Amazon Technologies, Inc., Reno, NV (US)

(72) Inventors: Keerat Singh Sharma, Lynwood, WA (US); Guthrie Chipman Collin, New York, NY (US); Chesley Bernard Coughlin, Seattle, WA (US); Timothy John Craycroft, North Bend, WA (US); Gerard Gjonej, Bellevue, WA (US); Pramod Raghavendran, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,536

(22) Filed: Jul. 17, 2017

(65) Prior Publication Data

US 2017/0332197 A1 Nov. 16, 2017

Related U.S. Application Data

(63) Continuation of application No. 14/976,688, filed on Dec. 21, 2015, now Pat. No. 9,712,964.

(51) Int. Cl.
*H04W 4/021* (2018.01)
*H04W 4/02* (2018.01)
(Continued)

(52) U.S. Cl.
CPC .......... *H04W 4/021* (2013.01); *H04W 4/025* (2013.01); *H04W 4/029* (2018.02); *H04W 12/02* (2013.01);
(Continued)

(58) Field of Classification Search
CPC ....... H04W 4/02; H04W 64/00; H04W 4/028; H04W 12/08; H04W 12/02; H04W 4/185;
(Continued)

(56) References Cited

U.S. PATENT DOCUMENTS

| 9,712,964 B2 | 7/2017 | Sharma et al. |
| 2014/0066106 A1* | 3/2014 | Ngo .................. H04M 1/72572 455/457 |

(Continued)

FOREIGN PATENT DOCUMENTS

| DE | 112016005854 T5 | 10/2018 |
| EP | 1217857 | 6/2002 |

(Continued)

OTHER PUBLICATIONS

International Search Report and Written Opinion issued in Application No. PCT/US16/67953, dated Mar. 28, 2017, 13 pages.

(Continued)

*Primary Examiner* — Inder P Mehra
(74) *Attorney, Agent, or Firm* — Hogan Lovells US LLP

(57) ABSTRACT

Various approaches discussed herein enable techniques for managing privacy with respect to location-based operations, for example by receiving point of interest (POI) data corresponding to location data such as global positioning service (GPS) data at a computing device along with various location-based rules, which when satisfied, result in attribution events being generated that indicate various characteristics associated with POIs in the POI data. The attribution events are then sent to a server without compromising the location privacy of the computing device, because the location of the computing device is not included with the attribution events.

20 Claims, 8 Drawing Sheets

(51) Int. Cl.
*H04W 12/02* (2009.01)
*H04W 4/029* (2018.01)
*H04W 12/00* (2009.01)

(52) U.S. Cl.
CPC ............... *H04W 12/00502* (2019.01); *H04W 12/00503* (2019.01)

(58) Field of Classification Search
CPC ... H04W 8/18; H04W 4/023; H04W 52/0229; H04W 76/02; H04W 4/021; H04W 76/04; H04W 48/12; H04W 4/001; H04W 4/008
USPC ............ 455/456.1, 456.3, 414.1, 411, 414.2, 455/404.2, 457; 705/14.58
See application file for complete search history.

(56) References Cited

U.S. PATENT DOCUMENTS

2014/0074395 A1  3/2014  Brown
2014/0162692 A1  6/2014  Li et al.
2016/0205512 A1  7/2016  Petersen et al.
2016/0267762 A1*  9/2016  Ye .......................... G01C 21/20
2019/0138987 A1*  5/2019  Mattingly ............ G05D 1/0276

FOREIGN PATENT DOCUMENTS

EP      001217857 A2 *  6/2002  ............... H04Q 7/38
GB      2559719          8/2018
WO      2017/112739      6/2017

OTHER PUBLICATIONS

Non-Final Rejection dated Jan. 27, 2017 in U.S. Appl. No. 14/976,688.
Notice of Allowance dated Mar. 23, 2017 in U.S. Appl. No. 14/976,688.
International Preliminary Report on Patentability issued in Application No. PCT/US2016/067953 dated Jun. 26, 2018.

* cited by examiner

MAINTAINING PRIVACY IN LOCATION-BASED OPERATIONS

CROSS-REFERENCE TO RELATED APPLICATIONS

This is a continuation application of U.S. patent application Ser. No. 14/976,688, filed on Dec. 21, 2015, entitled "MAINTAINING PRIVACY IN LOCATION-BASED OPERATIONS," which is hereby incorporated herein by reference in its entirety.

BACKGROUND

Many people utilize location data to obtain the locations of, and directions to, various locations, as well as to locate places near a current or specific location. A person wanting to perform such a task typically opens an application on an electronic device, inputs the necessary information (such as a location or point of interest (POI)) and receives location information, driving directions, nearby points of interest, etc., and other such information. Often, the precise location of the electronic device is sent to a server in order to provide various functionality, which results in the server accruing a history of the device's, and the user's, location over time.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches for location-based operations on an electronic device where a device may be reporting location data back to third parties (e.g., servers), in effect leaving a breadcrumb trail of the user's location that may not be used in accordance with a user's wishes. In particular, various embodiments enable location-based operations on and/or associated with an electronic device by sending point of interest (POI) data to the device in conjunction with a set of location-based rules. Points of interest may include areas of interest, such as a long strip of beach. The electronic device uses location data (e.g., global positioning service (GPS) data, cell tower and/or Wi-Fi triangulation data, etc.) to determine whether any of the location-based rules are satisfied. In the event a location-based rule is satisfied, then a location-based event (e.g., attribution event, conversion event, or other type of event) is generated on the device that, for example, describes a potential characteristic of the user based on the device being at a particular POI without referencing the user's location, or in various embodiments, the particular POI or any information with which a third party could determine the identity or location of the POI. This location-based event is stored on the device and transmitted to a server at various intervals or upon request without including any information or data indicating a current or past location of the electronic device, according to various embodiments.

Various conventional approaches can determine whether a user (i.e., a device of a user) is in a location associated with a POI, but such approaches can result in the user's location being reported to third parties, application providers, and others; for example, a server containing POI data, mapping data, content such as offer data, or the like. The techniques described herein offer unconventional approaches to solving a problem inherent in location-based operations associated with an electronic device, which improves the operation and performance of the electronic (i.e., computing) devices on which they are implemented, as well as improving the technology of location-based identification, analysis, and reporting.

Figure 1:
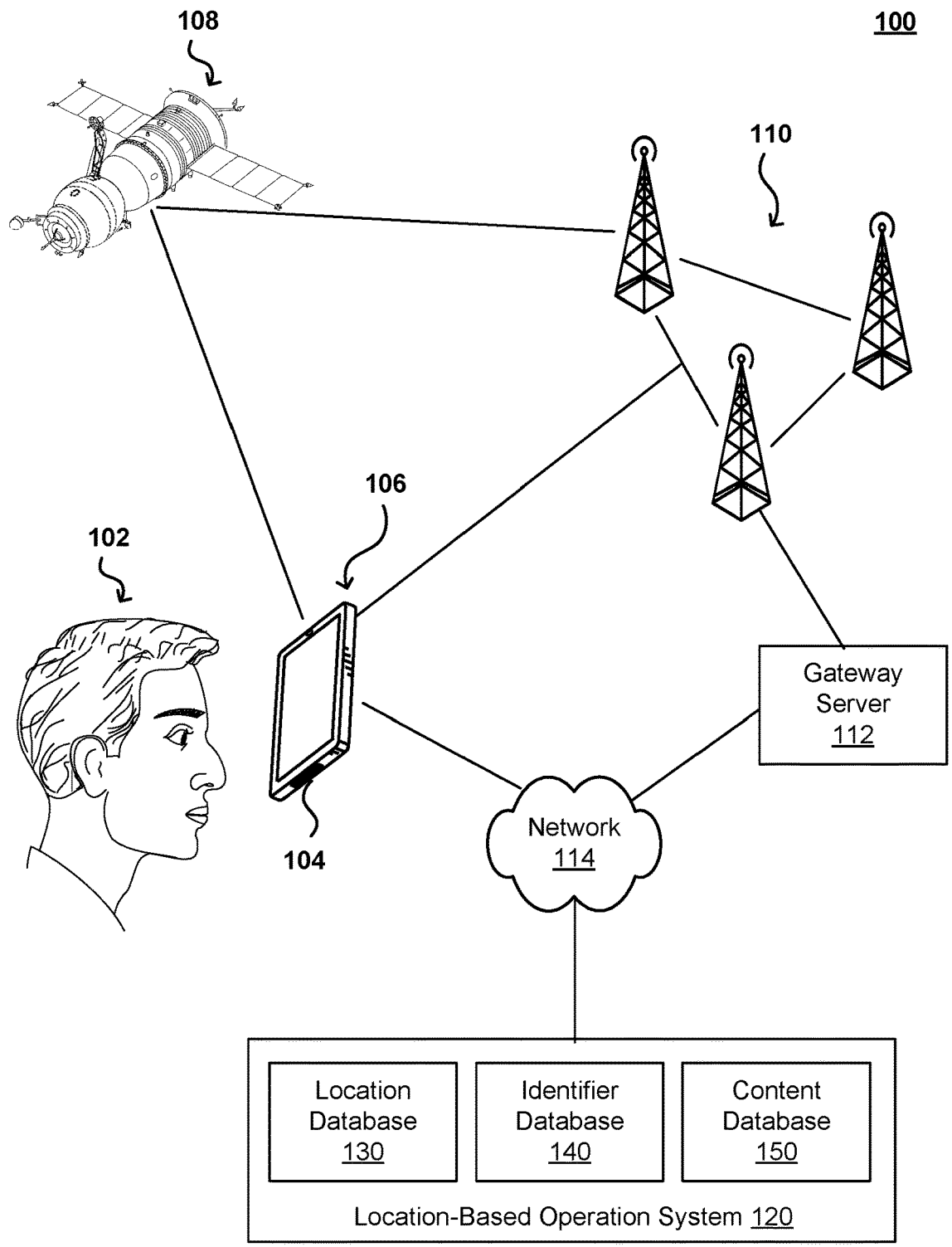
FIG. 1 illustrates an example system for providing location-based operations, in accordance with various embodiments.

FIG. 1 illustrates an example system 100 for providing location-based operations, in accordance with various embodiments. It should be understood that reference numbers may be carried over between figures for similar components for purposes of explanation, but that such use should not be interpreted as a limitation on the various embodiments.

In the example of FIG. 1, example system 100 for a user 102 includes a mobile computing device 104, global positioning satellites 108, a mobile communication infrastructure 110, a gateway server 112, a network 114, and a location-based operation system 120. According to various embodiments, system 100 may include additional, fewer, and/or a different configuration of the components shown in FIG. 1.

Mobile computing device 104 may be configured to provide telecommunication functions using mobile communication infrastructure 110. Mobile computing device 104 may be, for example, a cellular telephone, a personal digital assistant (PDA), a portable music player, a portable web browser, a digital camera, a video game console, or any other portable computing device. For purpose of explanation, mobile computing device 104 is described herein with reference to a cellular telephone or a device having cellular capabilities. Mobile computing device 104 may be configured to include one or more components configured to facilitate computing functions related to searching for information and presenting search results including a processor, memory, a display, etc.

According to an exemplary embodiment, mobile computing device 104 may be configured to include a location detection system 106. Location detection system 106 may include any type of system configured to determine the location of mobile computing device 104. Location detection system 106 may be implemented using hardware, software, or some combination thereof. According to an exemplary embodiment, location detection system 106 includes a Global Positioning System (GPS) receiver configured to receive global positioning signals from a plurality of global positioning satellites 108 to determine a current location of mobile computing device 104. In an exemplary embodiment, location detection system 106 may be used to determine the location of mobile computing device 104 within approximately 15 feet.

Alternatively, the location of mobile computing device 104 may be determined using any of a number of alternative locating methods. Further, location detection system 106 may be associated with any of the systems or devices within system 100. For example, where n the example of FIG. 1, mobile computing device 104 is a cellular telephone and mobile communication infrastructure 110 is a network of cellular towers, gateway server 112 may be configured to include location detection system 106 implemented as software configured to determine the location of mobile computing device 104 based on a signal received from mobile computing device 104. The accuracy of the location detection may be improved in the software using, for example, triangulation techniques and an increased number of cellular towers.

Mobile communication infrastructure 110 may be any type of communication infrastructure configured to provide connectivity between mobile computing device 104 and one or more other computing devices. An exemplary communication infrastructure 110 may include a network of cellular communication towers as shown in FIG. 1. Alternative communication infrastructures may include a wireless computing communication network such as a WiFi network, a Bluetooth network, a satellite network, or any other type of system configured to provide connectivity to mobile computing device 104.

Location detection may be provided based on the node or nodes of communication infrastructure 110 receiving a signal from device 104 as described above. Location detection using mobile communication infrastructure 110 may provide improved location detection inside buildings where GPS receivers may fail to receive GPS signals. Mobile computing device 104 may also be configured to use a combination of any number of location detection techniques to determine its current location. Location detection may be configured to be performed either automatically or based upon a user-driven location update instruction.

Location detection system 106 may further be configured to determine the orientation and/or direction of movement of the user. "Orientation" may be the current direction that the user is facing such as north, east, south, west. "Direction of movement" may be the direction in which the device 104 or the user of device 104 is traveling. The orientation and direction of movement may be determined using compass readings, data obtained from multiple waypoints, etc.

Orientation and direction of movement may be utilized by location detection system 106 to predict future locations. Specifically, the location may be set to locations that are in front of or along the direction of travel of the user. For example, where the location and/or direction of movement indicates the user is on an expressway, the location may be set to the next available exit from the expressway. Location detection system 106 may further be configured to implement a pathfinding algorithm where a user provides a destination, and the location is set to include a travel route including locations along a path between the user's current location and that destination. The predicted location may further be refined based on a detected mode of travel, such as walking, biking, driving, etc. The mode of travel may be determined based on location, speed of travel, etc.

Gateway server 112 may be any type of computing system connected to communication infrastructure 110 and configured to connect infrastructure 110 to at least one other network, such as network 114. Gateway server 112 may be configured to transfer messages from one type of network to the other. For example, gateway server 112 may be configured to receive a web page request from mobile computing device 104 over mobile communication infrastructure 110 and convert that message to a web page request for communication over network 114 to the computing host of the requested web page.

According to an exemplary embodiment, network 114 may be the Internet. Information network 114 may be configured to facilitate the transfer of information to and from location-based operation system 120 to mobile computing device 104 through gateway server 112 and mobile communication infrastructure 110.

Location-based operation system 120 may be a computing system configured to provide a listing of POI data, location-based rules, and content, among other data, described in further detail below. Location-based operation system 120 may include various components or elements, implemented in hardware or software according to techniques known in the art, comprising a location database 130, an identifier database 140 (e.g., Identifier for Advertisers (IDFA), MAC address, IP address, or any other type of identifying data, unique or otherwise) and a content database 150 operable to determine various data to send to a computing device 104, for example, as well as managing content and interactions one or more users may have or have had with that or other content, for example using an identifier from identifier database 140. According to various embodiments, one or more identifiers associated with identifier database 140 may be unable to uniquely identify a device, thereby providing benefits regarding privacy protection in location-based operations.

Figure 2:
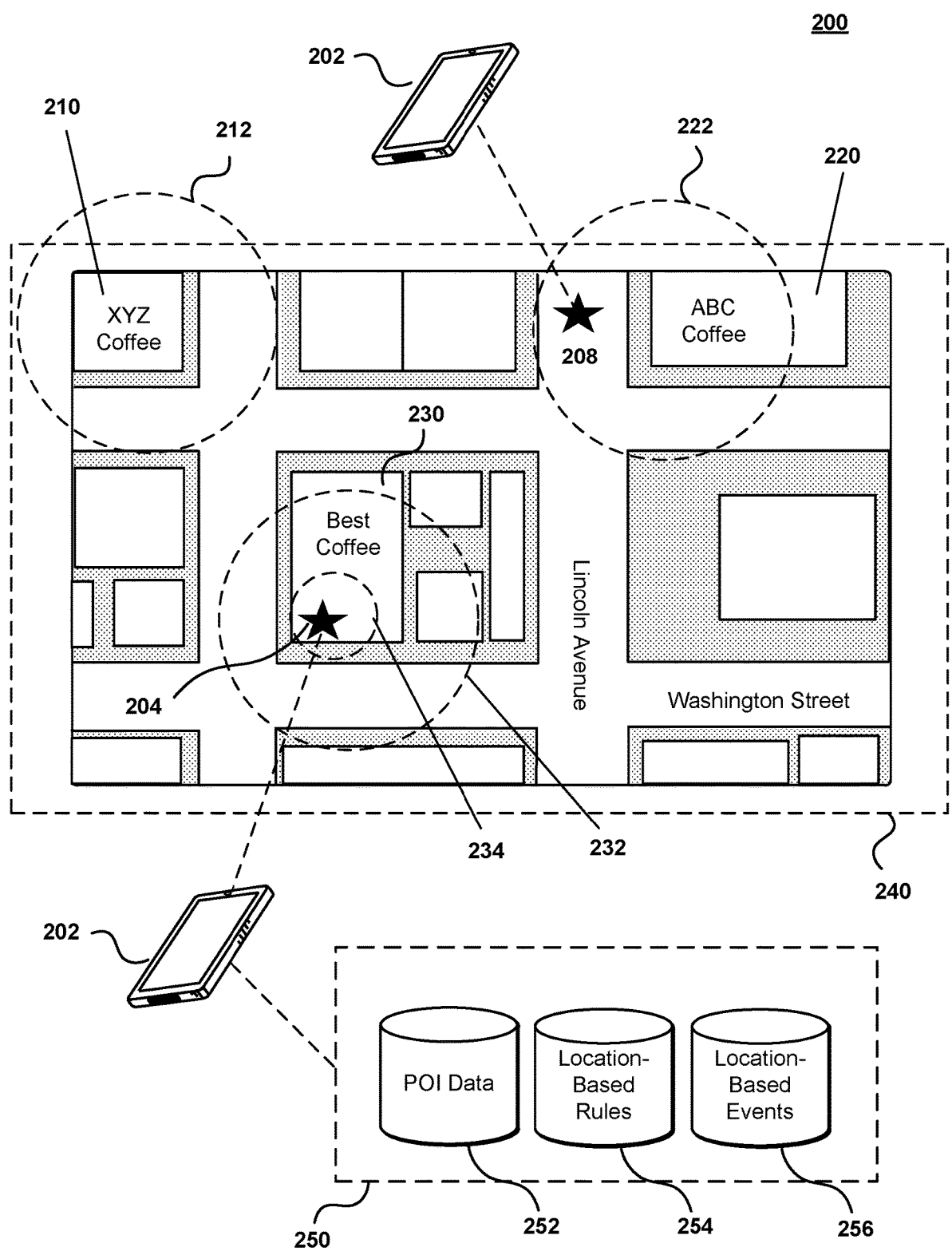
FIG. 2 illustrates an example situation for location-based operations, including generating attribution events, in accordance with various embodiments.

FIG. 2 illustrates an example situation 200 for location-based operations, including generating attribution events, in accordance with various embodiments. In the example 200 of FIG. 2, a geographic region 240 is illustrated. While in the example of FIG. 2, the geographic region 240 comprises several example city blocks, in various embodiments a geographic region 240 could be of different sizes. In various embodiments, a current and/or past position (e.g. location as defined by GPS data, etc.) of an electronic device may be associated with a geographic region 240, and an indication of the geographic region 240 sent from the electronic device in which the precise location of the electronic device cannot be determined; for example, because the geographic region 240 is large and the electronic device could be located anywhere in the geographic region 240. Without transmitting precise, fine-grained location data (e.g., location coordinates, GPS data, etc.) indicating where the electronic device is within the geographic region 240, privacy of the electronic device's actual location may be maintained.

In the example 200 of FIG. 2, an electronic device 202 is illustrated as being located at a beginning location 204 and a subsequent location 208 in the geographic region 240. As discussed herein, electronic device 202 is capable of determining and monitoring its position at a particular point in time and over a period of time; for example, using a GPS component and GPS data, such as that provided by the example system of FIG. 1.

According to various embodiments, electronic device 202 may have various data stored thereon. In this example, electronic device 202 is shown as having a data store 250 storing POI data 252, location-based rules 254, and location-based events 256, such as an attribution event (e.g., a user has a certain attribute, for example being at a particular location, type of location, brand, etc.), a conversion event (which may happen at an electronic device and/or a server (e.g., a person has taken an action at a location or has an attribute, in response to another action, such as viewing content, receiving content being prompted in some manner, etc.), or other type of event, for example as a result of a location-based rule being evaluated, content being sent, consumed or otherwise interacted with, etc., each of which will be described more fully herein. In various embodiments, additional and or different data may be maintained by electronic device 202 in one or more databases/data stores, for example stored in flash storage, although the data store may be stored on any type of internal or external storage, and in various embodiments some or all of the data 252-256 may be stored on a server that is communicatively coupled to electronic device 202 by a network, for example.

According to various embodiments, POI data 252 may be received at electronic device 202, for example from a server. Examples of POIs include specific locations that users may find useful or interesting, and which have a designed location that may be defined by location data (e.g., GPS data). In various approaches, a POI may be defined by a boundary or shape in the location data, such as a polygon, and the user may be deemed "at" the POI when the user's GPS coordinates are inside the boundary, for example. In the example of FIG. 2, XYZ Coffee 210, ABC Coffee 220, and Best Coffee 230 are all POIs. Individual POIs may be organized in POI data, for example in categories, types, or according to some type of common relation. In the example of FIG. 2, XYZ Coffee 210, ABC Coffee 220, and Best Coffee 230 are all POIs of the type (or category) "Coffee Shops." As is commonly done, if a user did a location search in geographic region 240 for "Coffee Shops," the query would return all POIs in geographic region 240 that are identified as being in that category, in this example, XYZ Coffee 210, ABC Coffee 220, and Best Coffee 230.

Current approaches to location-based operations, such as searching for, navigating to, and being in the vicinity of POIs can have serious privacy drawbacks. While performing location-based operations, the device may be constantly "pinging" a server; for example, providing a precise device location to one or more entities (e.g., servers, etc.) in order for the one or more entities to provide data and/or services to the device, such as location data, POI reviews, traffic conditions, advertising data, etc. While sharing this precise device location may offer behavioral insights about a user of the device that could be used to "target" the user with pertinent information, the user has to trade the privacy of her precise location, perhaps over a long period of time. The techniques described herein overcome these and other drawbacks related to privacy concerns, among others, while allowing a user to experience the potential benefits of targeted location-based content (e.g., having access to useful services supported by targeted content, receiving potentially relevant location-based suggestions, content, and/or offers, etc.) without giving up privacy regarding her location.

In the example of FIG. 2, there are three POIs 210, 220, 230, all of the same type ("Coffee Shop"), which have been received from a server and stored in POI data 252 on electronic device 202. Electronic device 202 may perform these and other location-based operations, for example by executing an application ("app"), executing a process managed by an embedded SDK, or some other set of instructions that enable communication with a server, for example. As will be discussed further herein, various approaches allow the retrieval of specific portions of a larger set of POI data 252 that is available at a server; by reducing the amount of POI data 252 transmitted to the device, improvements to the functioning of the device are obtained, such as reducing bandwidth and processing resources required to receive and process extraneous or unnecessary POI data.

According to various embodiments, location-based rules 254 that correspond to the POI data 252 may be received at electronic device 202, for example from a server. A location-based rule 254 comprises in one example data that takes input, evaluates the input based on one or more criteria, and creates output as a result. For example, a location-based rule may comprise data that is capable of being utilized to accept a GPS location as input, evaluate whether the GPS location matches some criteria, and outputs a result. Examples may be:

1. If the current location of the device is in an auto dealership POI, then the user is in the market for a vehicle.
2. If the device has been within one mile of a beach POI three times over the past two months, then the user is a beachgoer.
3. If the device has been at a coffee shop POI twice this week, then the user is a frequent coffee drinker.

Location-based rules 254 may be validated based on binary criteria (e.g., the device either was or was not within 500 feet of an auto dealer POI, etc.), or may evaluate various criteria in order to determine whether the location-based rule may be determined to have been "satisfied," or answered in the affirmative. For example, various criteria such as duration within a certain distance of a location associated with a POI or POI type, a level of precision regarding the location data (e.g., is it triangulated with GPS data, coarse-grained, fine-grained, etc.), a closest distance that the device is determined to achieve with regard to the POI location (e.g., the device was within 100 feet of the POI vs. the device was inside the POI, etc.), etc., may be evaluated, for example to determine a "proximity score" or other type of metric that may be compared, for example to a threshold such as a "proximity threshold." If the threshold is met, then the location-based rule may be considered to have been satisfied. A "dwell score" or similar metric may be used to satisfy a location-based rule. For example, a determination that the current position of the electronic device is within a threshold distance of a particular POI for a certain amount of time may be made, and a dwell score corresponding to a location-based rule associated with the particular POI calculated, the dwell score based at least in part on the certain amount of time and/or a distance of the electronic device from the particular POI during the certain amount of time. If the dwell score exceeds a particular threshold or value, then the location-based rule may be considered satisfied. Other types or criteria could be considered in performing a scoring approach to location-based rule satisfaction. For example, scoring could take into account various factors such as time, a precision of a location event, a degree within which a geofence was penetrated, weighting of nested geofences (e.g., an outer geofence has a lower weighting than an inner geofence, etc.), prior location events on the same device (or by the same user on other devices), and the like.

According to various embodiments, additional data such as phone numbers dialed by the electronic device may be considered when evaluating location-based rule satisfaction. For example, POI data may indicate various phone number data, such as phone numbers belonging to particular POIs. A list of phone numbers dialed by the electronic device may be determined, and if the phone number data associated with the POIs matches one or more phone numbers dialed by the electronic device, then that fact may be taken into account in determining that a location-based rule has been satisfied. The device may generate a location-based event in response, and send data to a server, the data not including any of the phone numbers dialed by the device; rather, various embodiments would have the location-based event indicating "dialed phone number associated with POI type," for example. Additional embodiments may include additional criteria in the determination of the location-based rule being satisfied based on phone number data; for example, determining that a phone number was dialed by the electronic device within a threshold time of a particular time (e.g., the current time). In various embodiments, the phone number data may include multiple phone numbers a multiple POIs of one or more types, which would allow for further privacy protection if none of the phone numbers were associated with a particular POI; rather, all that is needed is to determine that one of a certain list of numbers was called.

According to various embodiments, location-based events 256 (e.g., attribution events, conversion events, are generated at the device 202 in response to one or more location-based rules 254 being satisfied or otherwise met, and indicate behavioral or other attributes about the user of the device, without divulging private location information. Examples of attribution events may be:
1. "Visited car dealership"
2. "Visited beach"
3. "Visited coffee shop"

According to various embodiments, the location-based events 256 are associated with a POI type and not a specific POI; in this manner, privacy may be maintained, because knowing a precise POI (e.g., ABC Coffee 220 on Lincoln Avenue) may provide a precise location of the device. As discussed further herein, a device may send coarse location data to a server (e.g., an indication of a geographic region, an IP address, etc.) that can be utilized to determine an appropriate set of POI data and location-based rules to send to the device. In an example, the device sends a geographic region associated with its location, where the geographic region is an area of a minimum number of square miles, for instance, such that the precise location of the electronic device is not able to be determined with precision. In various embodiments, the device may triangulate itself and send data indicating a city, state, or country, in addition to or rather than geographic regions. A device may truncate its precise location in order to provide coarse location data. For example, a device may send location data to a server indicating only that the device is in Kansas. As a result, the server can determine that any POIs in the "Ocean" or "ocean beach" category may be excluded from the payload delivered to the device. Likewise, the POI data and location-based rules may be "sanitized" in the event that the coarse location data provided by the device 202 indicates that the device location could be given away because a particular POI or POI category and its associated location-based rule was sent to the device. For example, the device 202 could send location information only indicating that the device is in Wichita, Kans. The server could determine that in Wichita, Kans., there is only one sporting goods store; therefore, sending POI data for the sporting goods store and a location-based rule that generates a location-based event of "visited sporting goods store" would still be detailed enough to betray the device's 202 location.

In the example of FIG. 2, the device 202 starts 204 at "Best Coffee" 230, the location of which is described in POI data 252 received from the server along with two location-based rules 254. The first location-based rule provides that if the device enters the first geofence 232 surrounding Best Coffee, then an location-based event is generated that provides, "visiting coffee shop." This location-based event is stored 256 and sent to a server, which processes the event and in response, queues content to be sent to the device the next time the device contacts the server. By asynchronously sending data in this manner, bandwidth and processing resources may be conserved.

In this example, the content comprises an offer for ABC Coffee 220, along with POI information for ABC Coffee 220 (if not already sent) and a location-based rule that provides if the device 202 enters the geofence 222 around ABC coffee, then generate an location-based event of "visited coffee shop" and a conversion event (although in some embodiments, a conversion event may be generated at a server, for example). Because the server does not know the precise location of the device 202, only the geographic area 240 that was provided by the device, targeted content that implicates privacy (e.g., "I know that you are at Best Coffee, so I will send you an offer for Best Coffee") can be avoided, but the benefit of content that displays relevance to the user's behavior (e.g., "I know that you visit coffee shops in this geographic area 240, so I will send you an offer for a coffee shop type POI in the geographic area 240") can still be provided.

A second location-based rule associated with Best Coffee 230 may provide that if the device enters the second geofence 234 and stays there for more than 5 minutes, then another location-based event that provides, "frequent coffee drinker" is generated. In this example, once the device 202 fulfills the second location-based rule and the location-based event is sent to the server, then the server sends the offer to ABC Coffee 220. The user receives the offer, and decides to leave Best Coffee 230 and go to ABC Coffee 220, where the location-based rule is satisfied based on the device's new location 208, as discussed above.

Figure 3:
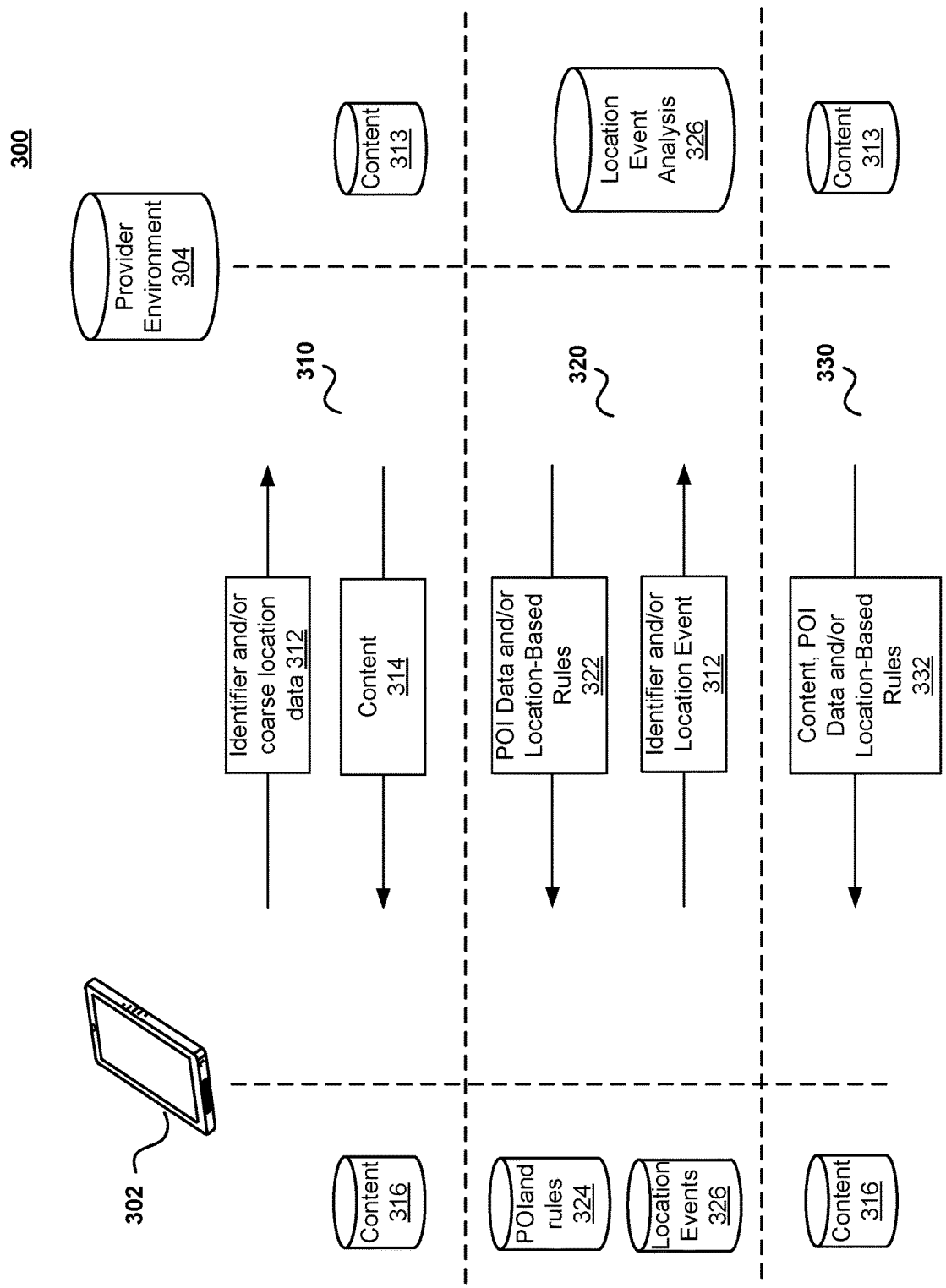
FIG. 3 illustrates an example sequence of events for providing location-based operations, in accordance with various embodiments.

FIG. 3 illustrates an example sequence of events 300 for providing location-based operations, in accordance with various embodiments. It should be understood that additional or alternate sequences of events may be performed according to the techniques described herein. FIG. 3 illustrates multiple "swim lanes" 310, 320, 330 of groups of activities, each of which may be performed independently or in response to other swim lanes 310, 320, 330, as the swim lanes 310, 320, 330 are illustrated for ease of understanding.

In the example of FIG. 3, an electronic device 302, for example a cellphone of a user, and a provider environment 304 (e.g., a back-end server or servers) are illustrated. The provider environment 304 may comprise various data stores 313, such as POI data, location-based rules, content that may be delivered to the electronic device 302 or that can or has been delivered to other devices, such as those associated with the user of the electronic device 302, along with exposure event data potentially indicating whether the content has been interacted with, data concerning how the content was delivered, etc.

In the first swim lane 310 illustrated in FIG. 3, a device identifier is sent 312 to the provider environment 304, in some embodiments accompanied with coarse location data; e.g., location data that does not provide a precise location of the electronic device 302, either by being truncated or otherwise modified from the precise data form, or only identifying a generic geographic region or area within which the device may be located. The provider environment 304 sends content 314 to the electronic device 302, for example from the content data store 313, which is received by the electronic device 302 and stored, for example in a content database 316 on the device 302. In the second swim lane 320, in various embodiments as a result of exposure data at the provider environment 304 indicating that some action has been taken with regard to the content 314 previously sent, sends data 322 to the electronic device 302, such as POI data (e.g., POIs, POI types, location data for POIs, etc.) and associated location-based rules.

The data 322 is stored at the device 302, for example in a POI and location-based rules database 324. One or more of the location-based events is determined to be satisfied at the device 302, as described herein, and a location-based event is generated and stored on the device 302, for example in a location events database 326. Data is sent from the electronic device 327, for example including location event data (e.g., device identifier and location-based event). The data is received at the provider environment 304, for example at a location event analysis 326 component. According to various embodiments, location event analysis 326 may determine, based on the location event data received from the device 302, that the user associated with the device is in a particular segment (e.g., frequent coffee drinker), and/or that the user has taken some type of action associated with content (e.g., conversion event), such as content having been previously delivered or consumed at a device associated with the user (e.g., phone, tablet, an email received by the user, etc.). This location event data, including conversion events, is analyzed with regard to the content database 313, and additional data may then be sent to the device 302 in the third swim lane 330, such as additional content, POI data, and/or location-based rules 322, which is stored on the device 302, for example in the content database 316.

Figure 4:
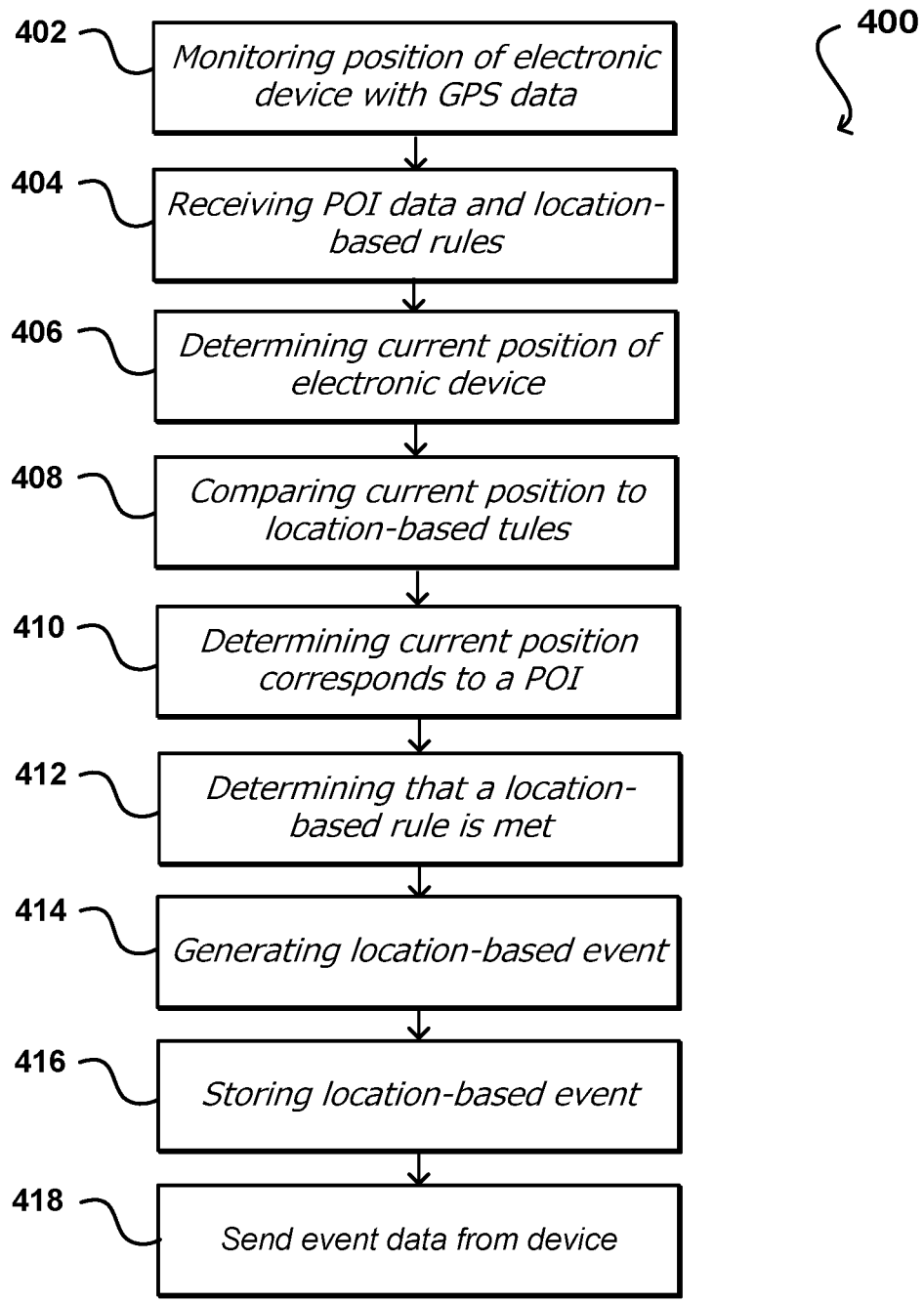
FIG. 4 illustrates an example process for location-based operations, in accordance with various embodiments.

FIG. 4 illustrates an example process 400 for location-based operations, in accordance with various embodiments. It should be understood that, for this and other processes discussed herein, there can be additional, fewer, or alternative steps, performed in similar or alternative steps, or in parallel, within the scope of the various embodiments unless otherwise stated.

In the example 400 of FIG. 4, a position of an electronic device is monitored 402, for example using GPS data. In various embodiments, the position of the electronic device may be monitored at a specific time or over a period of time. Positional information and corresponding time information may be stored on the electronic device. POI data and corresponding location-based rules is received 404, for example over a network from one or more servers. According to various embodiments, the POI data includes one or more POIs, some or all of which are associated with a particular location (e.g., a location defined by GPS data, a boundary, a polygon, and/or other techniques) and have a corresponding POI type or category, which may be further organized in a hierarchical or other related fashion.

The current position of the electronic device is determined 406 and compared 408 to one or more of the location-based rules, for example to determine whether the current device position corresponds to a POI location 410. In various embodiments, as described earlier, various criteria may be utilized in a location-based rule; e.g., a location-based rule may comprise one or more geofences, may specify various distances and/or time periods, etc. A determination 412 is made whether the location-based rule has been met, or "satisfied," for example based on various factors such as the current device position corresponding to a location associated with one or more of the POIs, which may encompass being within a threshold distance, being within a geofence, etc.

In response to one or more of the location-based rules being satisfied, one or more attribution events are generated 414 and stored 416 at the device, and then sent 418 along with a device-specific identifier, for example to a server. In various embodiments, an example of a device-specific identifier may be an Identifier for Advertisers (IDFA), a unique identifier tied to the device, such as a MAC address, or other type of identifier capable of identifying a specific device. According to an embodiment, the device-specific identifier and the attribution events do not contain information indicating the current position for the electronic device. In one or more embodiment, the device-specific identifier and the attribution events do not contain any location information capable of identifying a location of the device within a certain threshold.

Figure 5:
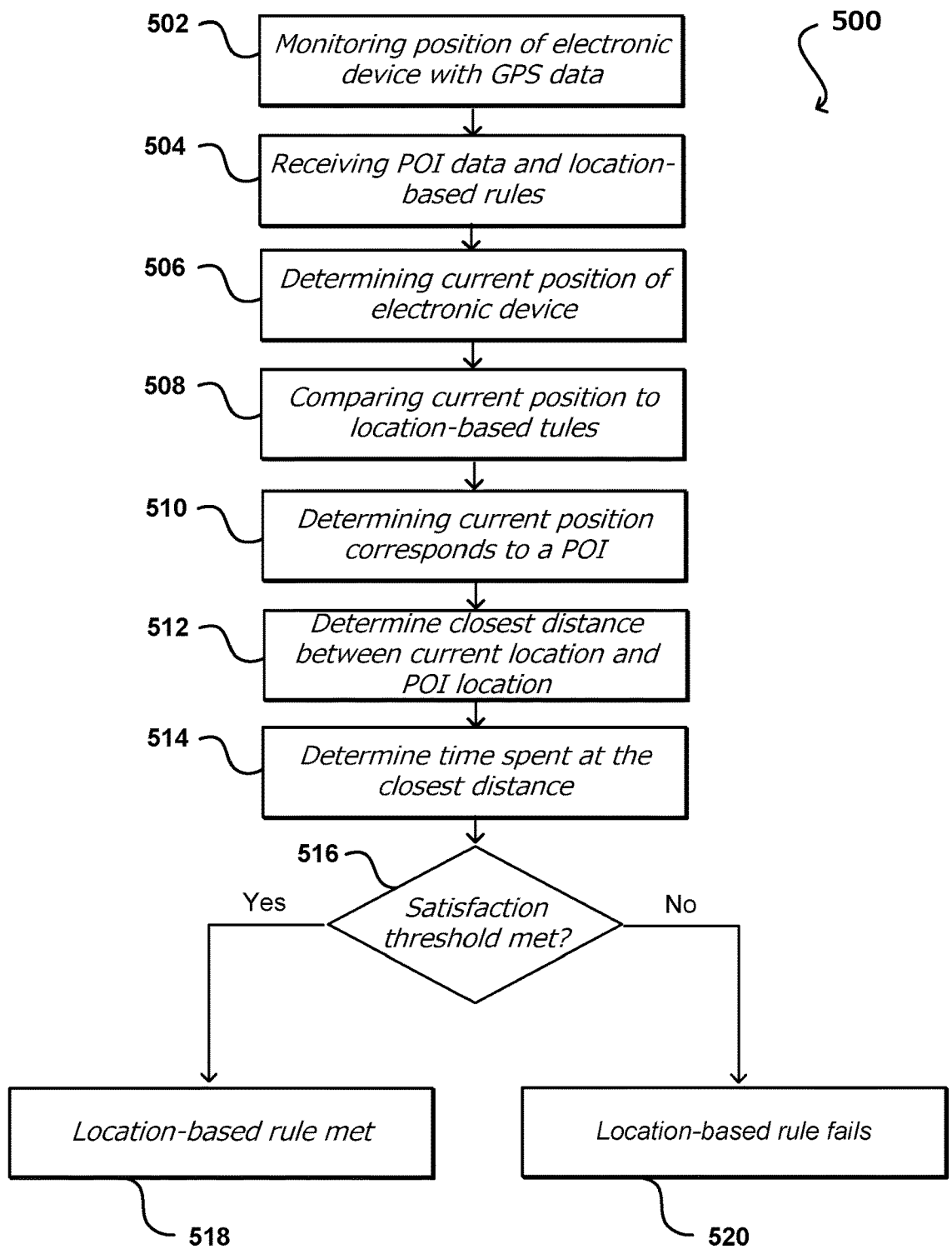
FIG. 5 illustrates an example process for location-based operations, in accordance with various embodiments.

FIG. 5 illustrates an example process 500 for location-based operations, in accordance with various embodiments. In the example 500 of FIG. 5, a position of an electronic device is monitored 502, for example using GPS data. In various embodiments, the position of the electronic device may be monitored at a specific time or over a period of time. Positional information and corresponding time information may be stored on the electronic device. POI data and corresponding location-based rules is received 504, for example over a network from one or more servers. The current position of the electronic device is determined 506 and compared 508 to one or more of the location-based rules, for example to determine whether the current device position corresponds to a POI location 510.

A closest distance between the current position of the device and the location associated with one of the POIs is determined 512, along with an amount of time 514, for example spent at the closest determined distance. For example, if a device was within ten feet of a POI location for three seconds, then that could be construed as the user of the device simply walking past the POI. If the device was within five feet for three minutes, then that could be construed as "window-shopping," or a similar type of activity or characteristic. Based on various criteria such as the distance and time, a determination is made whether a threshold value is met 516, such as a "satisfaction threshold" or "proximity threshold." Various scoring techniques, along with or instead of, additional metrics may also be used in the determination. If the location-based rule is not met; i.e., it fails 520, such as by a satisfaction score or proximity score not meeting a threshold. If the threshold value is met, then the location-based rule is met or satisfied 518.

Figure 6:
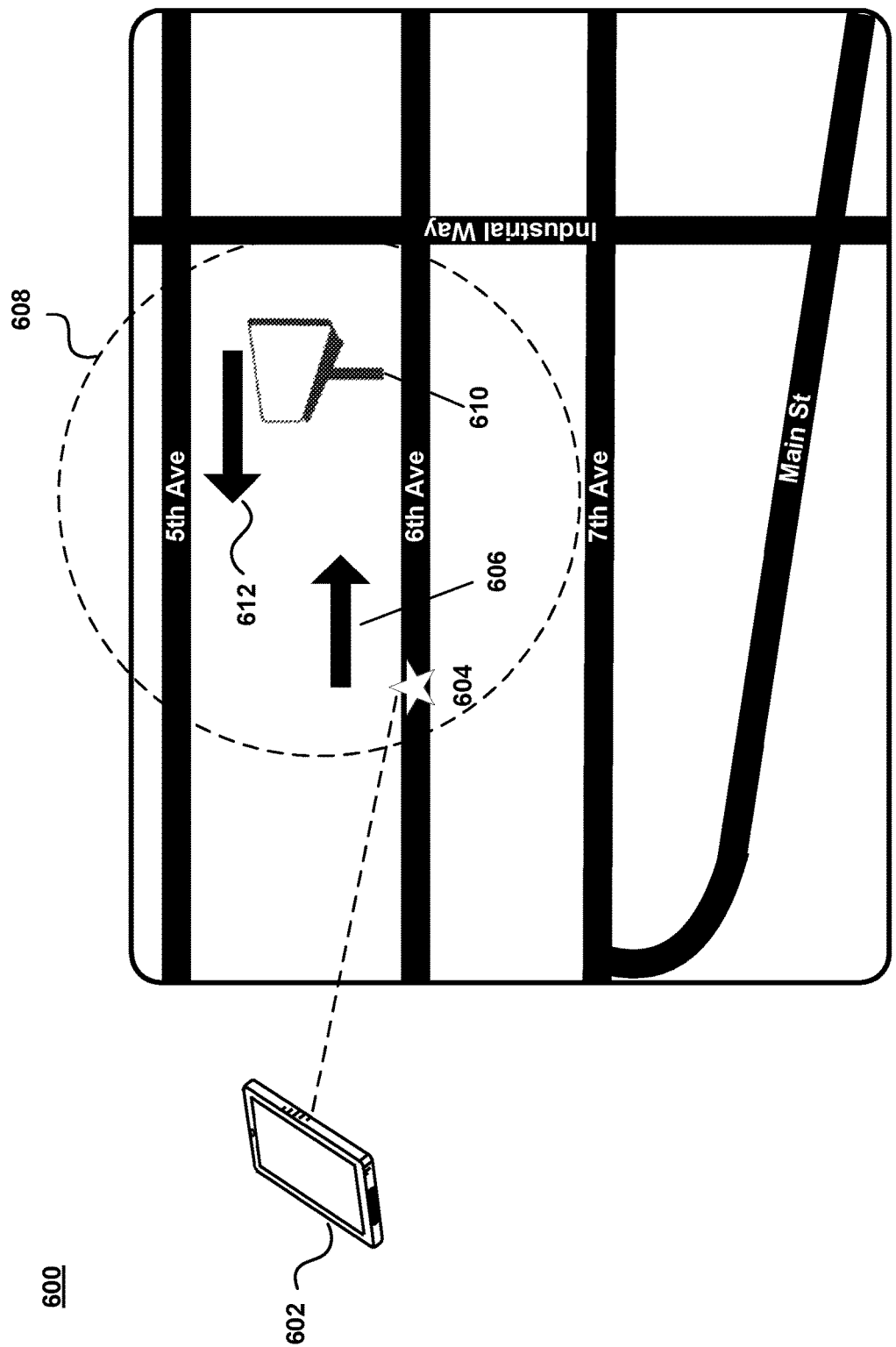
FIG. 6 illustrates an example situation for location-based operations, including generating attribution events, in accordance with various embodiments.

FIG. 6 illustrates an example situation 600 for location-based operations, including generating attribution events, in accordance with various embodiments. In the example situation 600 of FIG. 6, an electronic device 602 is determined to be at a particular location 604 on "6$^{th}$ Ave." and to be traveling in an Easterly direction 606. A POI, such as a billboard 610, is located along the travel path of the device according to location data, and is facing in a Westerly direction; e.g., the billboard 610 has a direction vector in its associated location data, which in some embodiments may be referred to as a "viewing vector."

In the example of FIG. 6, a location-based rule is associated with the billboard 610; namely, that if the current location of the device 602 is within a geofence 608 associated with the billboard 610, and a correspondence exists between the direction of travel of the electronic device and the viewing vector, then the location-based rule is satisfied.

The "correspondence" may be defined by the location-based rule, but in the example of FIG. 6, it means that the device 602 is traveling in a direction that would allow it to read the billboard 610. Other criteria may be included in the location-based rule; for example, a speed of the device 602 may have to be under a threshold value, the time of travel may have to be during specific hours/days, different attribution events may be generated based on traffic conditions (e.g., exposure time to the billboard because of being stalled in traffic, etc.), etc.

Once it is determined that the location-based rule is satisfied, then in an embodiment, an location-based event (e.g., saw billboard", etc.) is generated at the device 602 that corresponds to the POI type (e.g., "billboard" or "Advertiser X billboard" or "Billboard advertising Y product", etc.) to which the POI belongs, and is sent from the device 602 along with a device identifier. In this way, user privacy is protected because no location information is sent from the device; rather, only an location-based event that offers a coarse level of detail regarding behavioral information associated with the device location.

Figure 7:
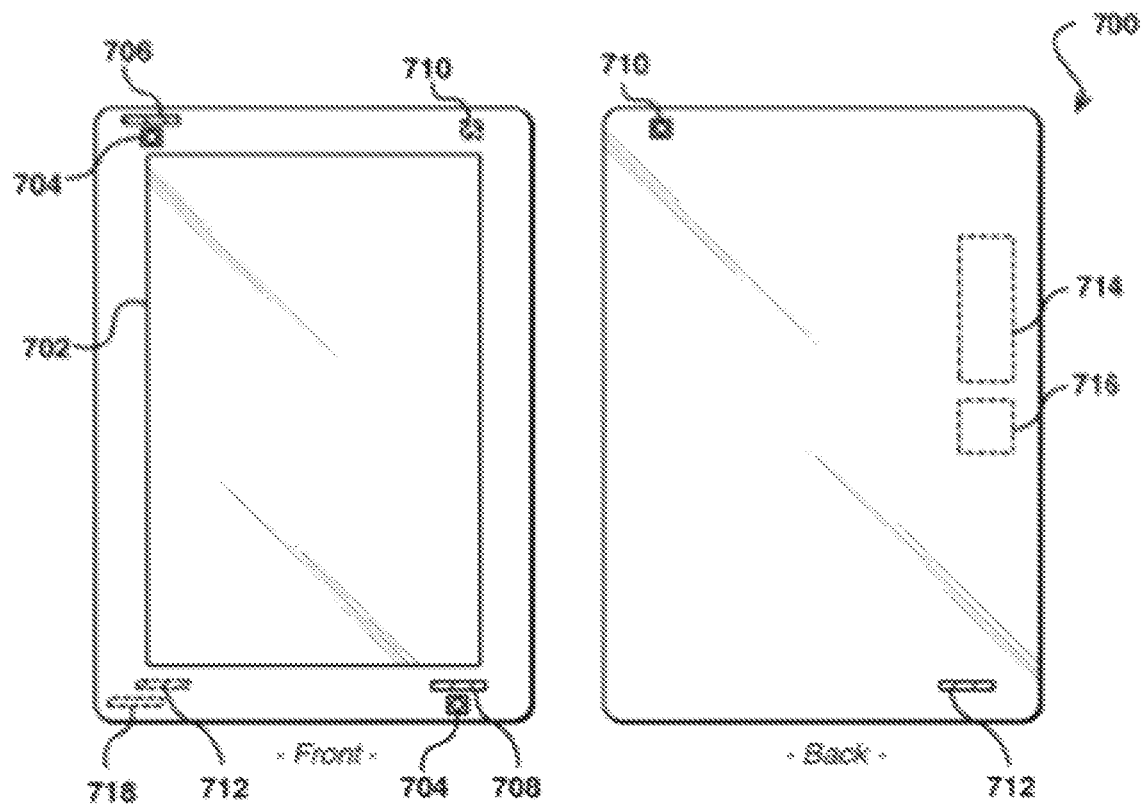
FIG. 7 illustrates an example electronic device that can be utilized in accordance with various embodiments.

FIG. 7 illustrates an example electronic device that can be utilized in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
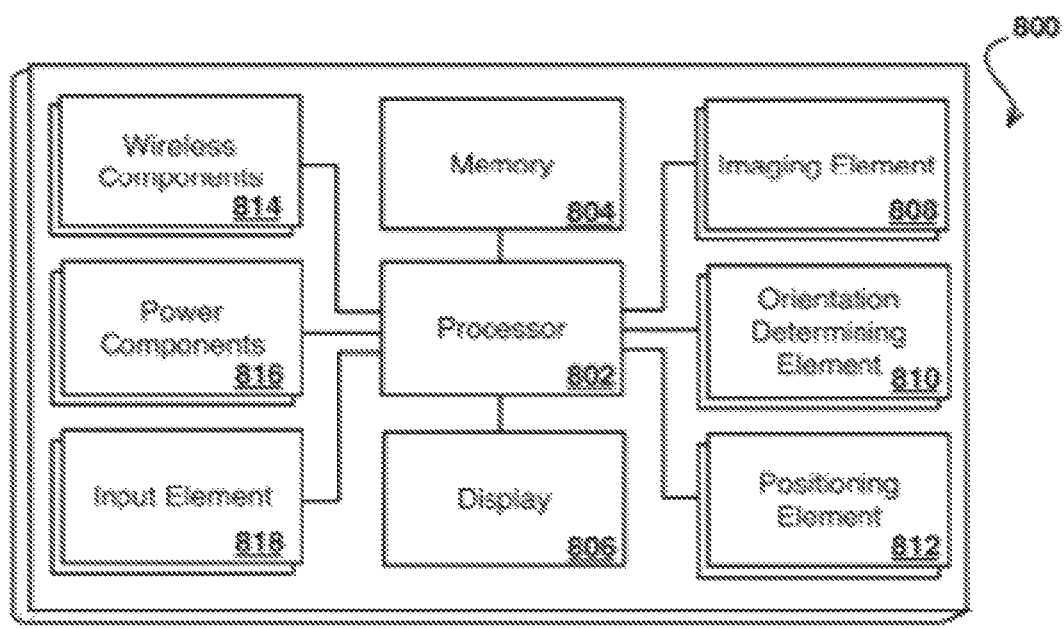
FIG. 8 illustrates an example configuration of components of an electronic device, such as the device illustrated in FIG. 7.

FIG. 8 illustrates a set of basic components of an electronic computing device 800 such as the device 700 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 9:
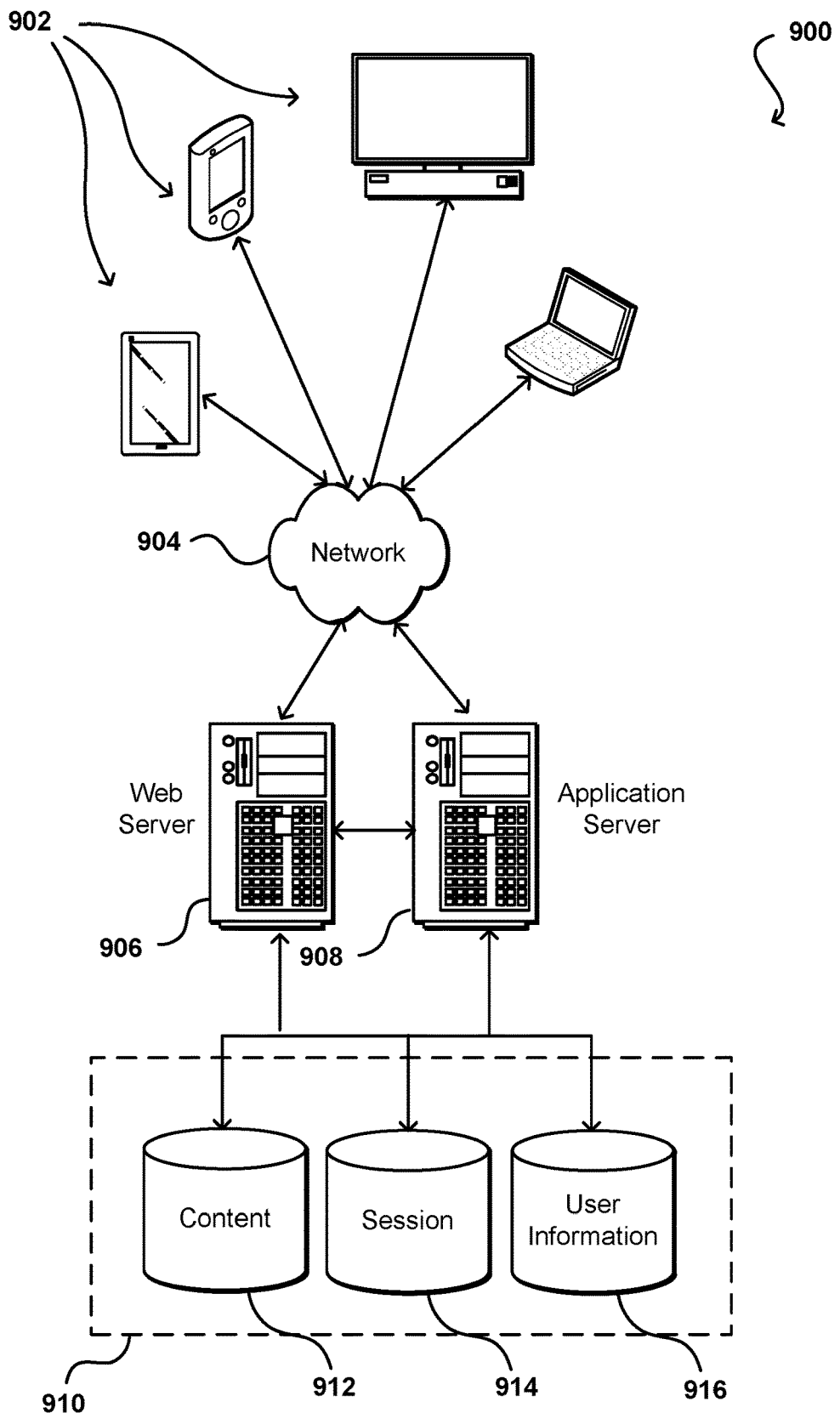
FIG. 9 illustrates an example environment in which aspects of the various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving, at a device, point of interest (POI) data for a POI, the POI data including POI location data and a POI type;
    receiving, at the device, a location-based rule associated with the POI;
    determining, at the device, a current location of the device;
    determining that the location-based rule associated with the POI is satisfied based at least on the current location of the device corresponding to the POI location data; and
    sending event data from the device to a server, the event data comprising the POI type and an identifier capable of identifying the device, wherein the event data is devoid of data capable of identifying the current location of the device, wherein the event data does not include data identifying the POI.

2. The computer-implemented method of claim 1, wherein the POI data and the location-based rule are portions of primary POI data and primary location-based rules, the primary POI data comprising potential POIs belonging to potential POI types, and wherein the POI data and the location-based rule is determined by:
    sending, from the device, an indication of a geographic region associated with at least one of the current location for the device or a past position for the device that was visited at least a threshold number of times in a specified time period, the geographic region having a diameter no less than a threshold amount of distance from the current location for the device or the past position for the device;
    determining, for an individual potential POI represented in the primary POI data, a privacy score based at least on a number of individual potential POI types corresponding to the individual potential POI being located in the geographic region;
    determining that the privacy score for the individual potential POI exceeds a certain threshold; and
    including the individual potential POI and the corresponding location-based rule in the POI data.

3. The computer-implemented method of claim 1, wherein determining that the location-based rule is satisfied further comprises:
    determining, on the device, that the current location of the device is within a threshold distance of the POI for an amount of time;
    determining a dwell score for location-based rule, the dwell score based at least in part on the amount of time and a distance of the device from the POI during the amount of time; and
    determining that the dwell score satisfies at least a threshold value.

4. The computer-implemented method of claim 1, further comprising:
    determining, for a particular rule of a set of location-based rules, at least two geofences associated with the particular rule, one of the geofences being an inner geofence and one of the geofences being an outer geofence, the inner geofence being nested within the outer geofence;
    determining, on the device, that the current location for the device is within the outer geofence;
    generating a first location-based event associated with the particular rule;
    determining that the current location for the device is within the inner geofence; and
    generating, a second location-based event associated with the particular rule.

5. A non-transitory computer-readable storage medium comprising instructions that, when executed by a processor of a device, cause the device to:
    receive point of interest (POI) data for a POI, the POI data including POI location data and a POI type;
    receive a location-based rule associated with the POI;
    determine a current location of the device;
    determine that the location-based rule associated with the POI is satisfied based at least on the current location of the device corresponding to the POI
    send event data comprising the POI type and an identifier capable of identifying the device to a server, wherein the event data is devoid of data capable of identifying the current location of the device, wherein the event data does not include data capable of identifying the POI.

6. The non-transitory computer-readable storage medium of claim 5, comprising the instructions that, when executed by the processor, further cause the device to:
    determine that content has been viewed on the electronic device;
    determining that a new location-based rule associated with the content is satisfied;
    generating, a new location-based event corresponding to the content;
    sending new event data comprising the new location-based event along with the identifier, wherein the new event data is devoid of data capable of identifying the current location of the device; and
    receiving new POI data and an additional location-based rule.

7. The non-transitory computer-readable storage medium of claim 6, wherein the location-based rule comprises a geofence associated with the POI and the new location-based rule comprises a new geofence associated with the POI, the new geofence having a smaller diameter than the geofence.

8. The non-transitory computer-readable storage medium of claim 6, wherein the content is associated with the POI and the instructions that cause the device to determine that the new location-based rule associated with the content is satisfied cause the device to:
    determine a view-based time at which the content was viewed on the device;

determine a satisfaction score, the satisfaction score based at least one of: a time difference between the view-based time and a location-based time at which the current location corresponded to the location, a level of precision associated with the current location corresponding to the location, or an amount of penetration achieved by the device into a geofence associated with the POI; and determine that the satisfaction score exceeds a particular threshold.

9. The non-transitory computer-readable storage medium of claim 5, wherein the POI data includes phone number data for the POI, and wherein the instructions further cause the device to:

receive a new location-based rule associated with the POI;
access a list of phone numbers dialed in the device;
determine that the new location-based rule is satisfied based at least in part on the phone number data including at least one phone number of the list of phone numbers;
generate a new location-based event corresponding to the POI type; and
send the new location-based event and the identifier fro without including any phone numbers of the list of phone numbers.

10. The non-transitory computer-readable storage medium of claim 9, wherein the instructions that case the device to determine that the new location-based rule is satisfied cause the device to determine that the at least one phone number of the list of phone numbers was dialed in the device within a threshold time of a current time.

11. The non-transitory computer-readable storage medium of claim 5, wherein the POI data includes a new POI of a new POI type, the new POI having a new location and a viewing vector in the location data, and wherein the instructions further cause the device to:

receive a new location-based rule associated with the new POI;
determine a new current location and a direction of travel of the device;
determine that the new current location is within a geofence associated with the new location;
determine a correspondence between the direction of travel of the device and the viewing vector;
determine that the new location-based rule is satisfied;
generate a new location-based event corresponding to the new POI type;
store the new location-based event at the device; and
send the new location-based event along with the identifier from the device.

12. The non-transitory computer-readable storage medium of claim 5, wherein the location-based rule comprises a proximity threshold, and wherein the instructions that cause the device to determine that the location-based rule associated with the POI is satisfied cause the device to:

determine a proximity score based at least on one of distance between the current location and the location or an amount of time the current location is within a particular distance of the location; and
determine that the proximity threshold is satisfied based at least on the proximity score.

13. The non-transitory computer-readable storage medium of claim 5 comprising the instructions that, when executed by a processor, further cause the device to:

send, to a server, a geographical area representing a minimum distance surrounding the device; and determine a number of POIs of the POI type in the geographical area that exceeds a threshold amount.

14. The non-transitory computer-readable storage medium of claim 5, wherein the POI data comprises a plurality of polygons defined by the location data.

15. A system, comprising:
at least one processor; and
memory storing instructions that, when executed by the at least one processor, cause the system to:
receive point of interest (POI) data, the POI data including POI location data and a POI type;
receive a location-based rule associated with the POI;
determine a current location of the system;
determine that the location-based rule associated with the POI is satisfied based at least on the current location of the system corresponding to the POI location data; and
send event data to a server, the event data comprising the POI type and an identifier capable of identifying the system, wherein the event data is devoid of data capable of identifying the current location of the system, wherein the event data does not include data capable of identifying the POI.

16. The system of claim 15, wherein the instructions further cause the system to:
determine that content has been viewed in the system;
determine that a new location-based rule associated with the content is satisfied;
generate a new location-based event corresponding to the content;
send new event data comprising the new location-based event along with the identifier, wherein the new event data is devoid of data capable of identifying the current location of the system; and
receive new POI data and an additional location-based rule.

17. The system of claim 16, wherein the location-based rule comprises a geofence associated with the POI and the new location-based rule comprises a new geofence associated with the POI, the new geofence having a smaller diameter than the geofence.

18. The system of claim 16, wherein the content is associated with the POI, and wherein the instructions that cause the system to determine that the new location-based rule associated with the content is satisfied cause the system to:

determine a view-based time at which the content was viewed in the system;
determine a satisfaction score, the satisfaction score based at least one of: a time difference between the view-based time and a location-based time at which the current location corresponded to the location, a level of precision associated with the current location corresponding to the location, or an amount of penetration achieved by the system into a geofence associated with the POI; and
determine that the satisfaction score exceeds a particular threshold.

19. The system of claim 15, wherein the POI data includes phone number data for the POI, and wherein the instructions further cause the system to:
receive a new location-based rule associated with the POI;
access a list of phone numbers dialed in the system;
determine that the new location-based rule is satisfied based at least in part on the phone number data including at least one phone number of the list of phone numbers;

generate a new location-based event corresponding to the POI type in response to the new location-based rule being satisfied; and send the new location-based event and the identifier from the system without including any phone numbers of the list of phone numbers.

20. The system of claim 19, wherein the phone number data further includes a plurality of phone numbers for a plurality of POIs of the POI type.

* * * * *